United States Patent [19]

Sillars

[11] 4,202,483
[45] May 13, 1980

[54] CAN BODY CONVEYOR WITH ANTI-ROTATION MECHANISM

[75] Inventor: Frederick S. Sillars, Beverly, Mass.

[73] Assignee: USM Corporation, Farmington, Conn.

[21] Appl. No.: 923,337

[22] Filed: Jul. 10, 1978

[51] Int. Cl.$^2$ .............................................. B23K 1/16
[52] U.S. Cl. ...................................... 228/43; 113/115; 198/651; 198/654
[58] Field of Search ................... 228/43, 47; 113/115; 198/651, 653, 654

[56] References Cited

U.S. PATENT DOCUMENTS

| | | | |
|---|---|---|---|
| 1,074,630 | 10/1913 | Kruse | 228/47 X |
| 2,319,281 | 5/1943 | Winters | 198/654 |
| 2,530,412 | 11/1950 | Wallace | 113/115 X |
| 2,846,972 | 8/1958 | Bofinger | 228/47 X |
| 3,371,839 | 3/1968 | Sillars | 228/47 X |

Primary Examiner—Francis S. Husar
Assistant Examiner—K. J. Ramsey
Attorney, Agent, or Firm—Owen J. Meegan; Richard B. Megley; Vincent A. White

[57] ABSTRACT

A drive chain cooperative with a guide for successively advancing can bodies (or the like) coaxially is pivotally fitted with longitudinally spaced driving lugs adapted to grip the respective trailing ends of the bodies and thus prevent their unwanted shifting about their longitudinal axes. Each lug, in addition to its projection for gripping the trailing end, has a flat portion, slidably engageable with the guide to insure non-deviation of side seam body joints from alignment with a solder applicator. A sprocket beyond the guide and the applicator, and with which the chain is in mesh, has circumferentially spaced protrusions which pivotally actuate the lugs to release the can bodies for further processing.

9 Claims, 5 Drawing Figures

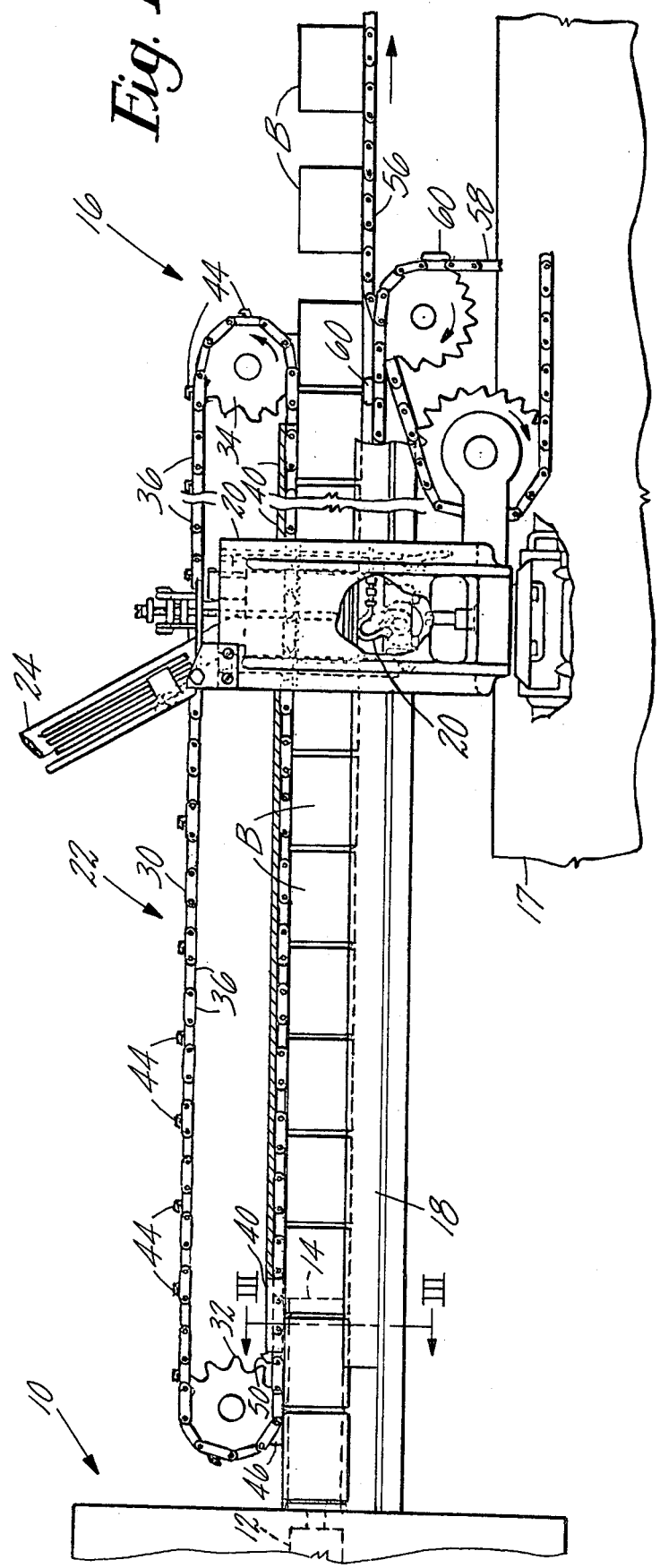

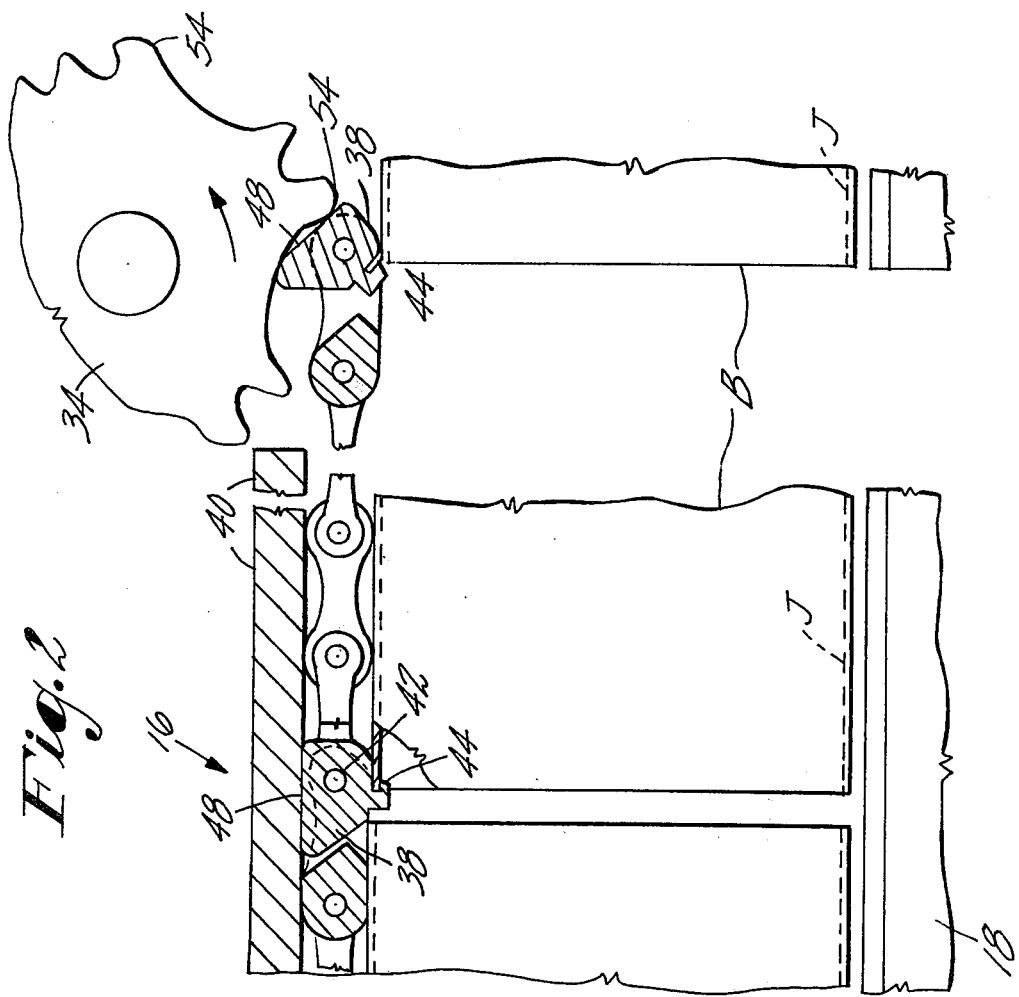
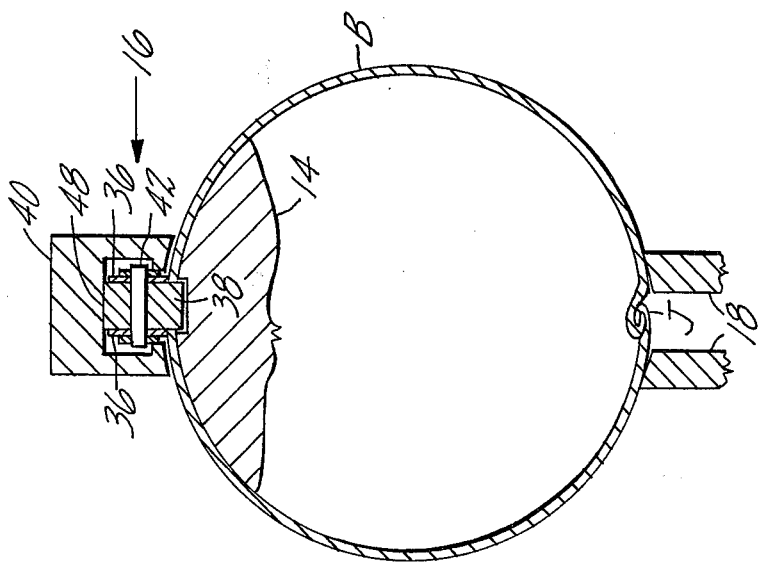

CAN BODY CONVEYOR WITH ANTI-ROTATION MECHANISM

CROSS-REFERENCE TO RELATED APPLICATION

An application Ser. No. 916,201 for U.S. Letters Patent was filed June 16, 1978 in my name and pertains to a stub horn constructed to internally engage can bodies for their guidance in a predetermined path.

BACKGROUND OF THE INVENTION

This invention relates generally to conveyor mechanism for advancing workpieces in alignment along a predetermined path. The invention is more particularly concerned with can body side seaming, and for purpose of illustration is accordingly specifically directed to coaxially feeding the can bodies in succession, the body feeding means being designed to insure that the joint openings of successive side seams travel a predetermined path coincident with molten effluent of a solder applicator.

In the prior art U.S. Pat. Nos. 3,000,338 and 3,056,368 issued in my name may be noted as representative of a number of side seam soldering machines employed in the can making industry. Such soldering machines and known body makers commonly produce the can bodies at rates of approximately 500/minute. Each body passes over a forming horn, and thence is guided by a stub horn, in end-to-end relation, to a solder applicator, and may thereafter travel to a lap depressor chain. Prior to the arrangement disclosed in my above-cited application, no system is known to have provided positive guidance for maintaining the bodies, especially their side seam joints, in accurate alignment with the applicator. Lack of this alignment feature is an important factor in preventing reduction in can body spoilage. Looked at from another standpoint, provision of means to prevent can body rotation so that each side seam joint is uniformly and properly exposed to molten solder assures that the soldered joints will all be of suitable strength and the solder will be economically applied exactly as required.

When it is desired or necessary to apply inside side striping to can body joints before the heat and solder for side seaming are applied, it is not possible to predeterminedly guide the bodies by internal engagement with the seam joints since this would remove or damage the striping. Therefore the technique disclosed in the above-cited application would not be feasible.

A further distinguishing aspect of this invention is to be noted. So-called drag chains or gripper chains have previously been incorporated in side seam soldering machines. Such device chains have employed non-articulated links, for instance a tapered pin in non-pivotal relation to each chain link, for gripping can ends and advancing them. This prior art design deforms (usually radially enlarges) the trailing can ends for can end mounting but coincidentally also adversely produces the possibility of small cracks or fissures emanating at the can ends from the flaring when the bodies are subsequently flanged. The present invention aims to avoid the propagation of such cracks and inhibit can body rotation during motivation.

SUMMARY OF THE INVENTION

In view of the foregoing it is a general object of this invention to provide structure for successively advancing workpieces, such as tubular can bodies or the like, non-rotatably and in predetermined alignment.

More particularly it is an object of this invention to provide, for use in a can body side seam soldering machine, a conveyor means comprising a motivating chain including elements for insuring accurate alignment of the seam joints of can bodies with a molten solder applicator.

To these ends the invention contemplates provision in a soldering machine of a motivating chain trained about a sprocket for advancing can bodies successively to a molten applicator, and incorporation in the chain of spaced pivotal lugs adapted to grip portions of the bodies respectively to advance them axially without deforming their configuration. Preferably, and as herein shown, a fixed guide bar is engageable with flat portions of the lugs to insure that side seam joints of the can bodies, when thus gripped, cannot deviate from a fixed operating path coincident with the molten solder emitted from the applicator. The seam joints are thus all exposed progressively, and to the same appropriate degree, to be soldered. Thereafter, for releasing the lugs from driving relation with the bodies, a cam surface of the sprocket is automatically effective to pivot each lug from gripping relation and allows the soldered bodies to be transferred to a removal conveyor.

BRIEF DESCRIPTION OF THE DRAWINGS

The foregoing and other features of the invention will now be more fully described in connection with an illustrative embodiment and with reference to the accompanying drawings, in which:

FIG. 1 is a view in side elevation of a side seam soldering machine including can body conveyor mechanism as associated with a can body maker partly illustrated;

FIG. 2 is an enlarged view in side elevation of a trailing portion of the conveyor mechanism broken away to reveal releasable can-gripping lugs;

FIG. 3 is a section taken on the line III—III of FIG. 1;

DESCRIPTION OF THE PREFERRED EMBODIMENT

Figure 4:
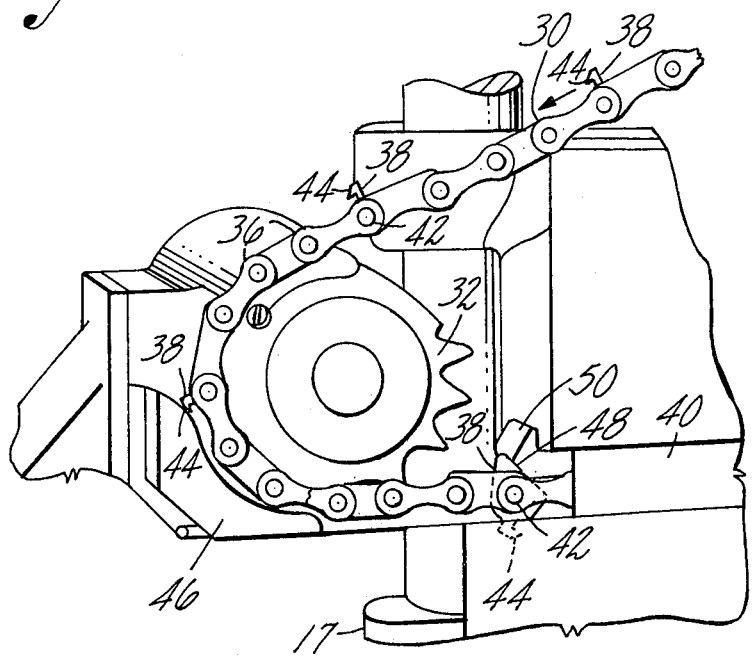
FIG. 4 is a perspective view of leading portions of the can body conveyor and an associated chain guide.

In FIG. 1, a can body forming machine generally designated 10 comprises a forming horn 12 from which successive can bodies B are axially advanced to be conveyed over a stub horn 14 of a side seam soldering machine generally designated 16. The latter comprises a frame 17 on which horizontal guide rails 18,18 are secured for externally supporting the bodies along opposite sides of their aligned side seam joints J to be soldered. In this instance the machine 16 includes for example, a molten solder jet applicator which may be in the form of a nozzle 20. For present purposes the particular form of the applicator 20 is not significant; importance is ascribed, however, to a body motivating means 22 to be hereinafter described whereby openings of the joints J are advanced in a predetermined operating path intersecting the solder jet so as to be uniformly soldered with sufficient, but not excessive, molten solder.

It will be understood that bars of solder as at 24 (FIG. 1) may be supplied to a reservoir 26, and that heating means at the reservoir, and both ahead of and after the applicator 20 are provided (though not herein fully shown) for suitably controlling temperature of the can bodies and the solder.

As illustrated herein the joints J are all shown in six o'clock orientation as they approach the applicator 20. It will be appreciated that the joints could in principle be otherwise oriented and aligned, but six o'clock positions are generally preferred. The invention to be more fully explained is occasioned by the fact that, unless constraint is practiced such as afforded by this invention, some deviation of the bodies B about their axes would occur. Such rotation would produce uneven or inadequate application of the solder at the misaligned joint, and hence a weakened or defective can body and wasted solder.

The can body motivating means 22 is shown in FIG. 1 as comprising an endless chain 30 meshing with an idler sprocket 32 (FIGS. 1,4) and a drive sprocket 34 (FIGS. 1,2). It will become apparent that the chain need not be entrained in exactly the mode illustrated. That is to say, the sprocket 32 could be the driving member or take the form of a roll, for instance, and the chain could at least in part, have an operating path determined by more than two rotating members. The chain is comprised of pivotally related outer side links 36 (FIGS. 1-3). At uniformly spaced intervals the chain is fitted with pivotal body-gripping lugs 38 (FIGS. 2-5) to be later described in more detail, and extends in the lower portion of its path parallel to the rails 18 and above the stub horn 14. For fixedly spacing this lower or operating portion of the chain path parallel to the stub horn and exactly spaced therefrom by substantially the thickness of the sheet metal constituting the can bodies B as shown in FIG. 3, a longitudinally slotted chain guide 40 in the form of a longitudinally slotted bar is secured, for instance by brackets not shown, to the frame 17 of the machine 16.

The lugs 38 (FIGS. 2,3) are respectively pivotally mounted on pins 42 of the drive chain and disposed between opposite side links 36. As the chain is driven, counterclockwise as seen in FIG. 1, a first L-shaped projection 44 (FIGS. 1,2,4&5) which had been extended upwardly from its lug 38 assumes a lowered vertical relation as the lug passes about the sprocket 32. A cam guide 46 (FIG. 4) fixedly mounted ahead of the chain guide 40 is arranged to cooperate with ends of the successive L-shaped lug projections 44 as they advance counterclockwise about the about the sprocket 32 thus preliminarily orienting the lugs 38 properly for engagement with the trailing rim ends of the bodies B, respectively.

Figure 5:
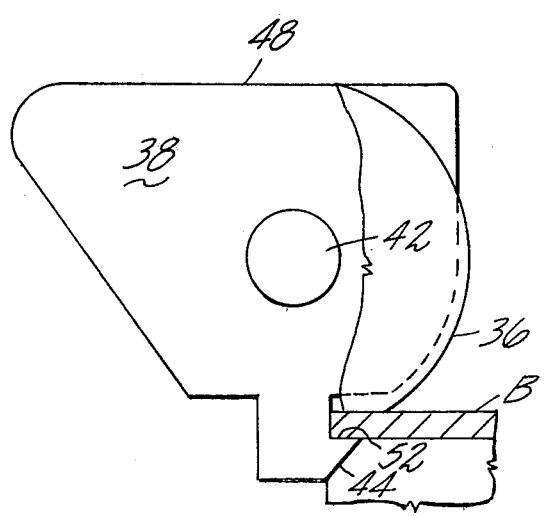
FIG. 5 is an enlarged view in elevation of one of the conveyor work gripping lugs.

After passing the six o'clock position of the sprocket 32, a flat side 48 of each lug engages a stationary inclined cam 50 (FIG. 4) projecting from the leading end of the chain guide. Accordingly the lug is tilted counterclockwise to cause the L-shaped projection 44, or more accurately its upper surface 52 (FIG. 5) to grip internally a portion of the trailing rim of the can body B as shown in FIGS. 2 and 5 to constrain the body B against motion about its axis. As shown in FIGS. 2 and 3, the flat side 48 of the lug and upper edges of the links 36 are then slidably engaged with the closely fitting inner wall of the slotted guide 40 to maintain the bodies B gripped against portions of the links 36 as they are advanced along their predetermined path wherein the successive joints J intersect the solder jet from the applicator 20. The stub horn 14 is longitudinally slotted as shown in FIG. 3 to accommodate the lugs 38 and the inner portions of the joints J to be soldered.

After passing the applicator 20 and the trailing end of the chain guide 40, the chain 30 passes about the sprocket 34. In order to release the lugs from the bodies B, the sprocket 34 is peripherally formed with at least one protrusion 54 (FIG. 2) arranged to engage the flat surface 48 of each lug 38. This camming engagement is effective to pivot the lug 38 clockwise, as seen in FIG. 2, about its pin 42 thereby unlatching the projection 44 and enabling each released can body B to be further advanced as by a dual take-away chain 56 (FIG. 1). As used in prior art arrangements, a lap-depressor chain 58 also shown in FIG. 1 is preferably, though not necessarily, disposed to compress body joint laps as by means of lugs 60, for instance as disclosed in U.S. Pat. No. 3,056,368 issued in my name.

Briefly to review operation of the side seam soldering machine 16, the bodies B with their side seam joints aligned in substantially six o'clock positions pass from the forming horn 12 onto the stub horn 14. There they are advanced successively by the successive lugs 38. For this purpose the projections 44 of the chain lugs 38 are guided into motivating position by the guide cam 46 (FIG. 4) and each lug surface 52 is then pivoted into body gripping relation by the cam 50. The arrangement is such that the lug surface 52 cooperates with the adjacent links 36 to grip the can body primarily at circumferentially spaced localities, one on each side of the 12 o'clock position. As shown in FIG. 2, cooperation of the flat surfaces 48 of the lugs 38 with the chain guide 40 maintain the projections 44 in body motivating position and constrain the can bodies and the seam openings of their joints J against deviation from a path coincident with the jet of solder emitted by the applicator 20. Accordingly a uniform and adequate application of the molten solder is deposited to produce soldered joints of proper strength.

When each body B has passed the applicator 20, its lug 38 approaches the sprocket 34. The sprocket protrusions 54 respectively engage the surface 48 of the lugs and successively pivot them clockwise about their pins 42 as shown in FIG. 4 to effect body release. As indicated in FIG. 1, the depressor lugs 60 will by then have served to reduce the thickness of end portions of the lap joints and the bodies B are thereafter advanced by the take-away chain 56.

I claim:

1. Conveyor mechanism for successively advancing workpieces along a path to expose pre-determined portions thereof to a molten solder applicator, the mechanism comprising: a drive chain; a chain guide cooperative therewith, and a plurality of spaced lugs each having one flat side pivotally carried by the chain and respectively responsive to engagement with the chain guide to grip a portion of the respective workpieces to hold them against rotation and to move them along said path, whereby said pre-determined portions are uniformly exposed to solder from said applicator, said flat sides being disposed on a side of the chain which is remote from the pre-determined portions of the workpiece to be soldered, said flat side further engaging said chain guide.

2. In a machine for soldering the side-seam joints of successive can bodies including a molten solder applicator and means extending at least to the applicator for slidably supporting the can bodies in axial arrangement and a conveyor mechanism comprising a plurality of spaced body gripping lugs, each one of which releasably engages a portion of the bodies to push them along the supporting means toward the applicator, and guide means disposed adjacent to the conveyor mechanism remote from said can body supporting means for engaging the lugs and causing the lugs to constrain movement of the bodies about their axes.

3. A machine as in claim 2 wherein the conveyor mechanism further comprises a chain trained about a sprocket, a cam portion of the guide means is arranged to cause each lug to grip a can body ahead of the applicator, and a protruding portion of the sprocket is arranged to effect release of the can body from the lug after the body passes the applicator.

4. A machine as in claim 2 wherein the conveyor mechanism comprises an endless link chain meshing with sprockets at the leading and downstream ends of the guide means, respectively, the lugs being uniformly spaced and pivotally mounted on the chain, the guide means being a longitudinally slotted bar, and at least one protuberance being on the downstream sprocket for disengaging the lugs from the successive bodies.

5. A machine as in claim 4 wherein each lug has a portion thereof pivotable by said bar into body gripping relation with said workpieces.

6. A machine as in claim 2 or 4 wherein each lug is formed with a first projection cooperative with an end portion of the guide means to effect the constraint of body motion about the body axes, and each lug is formed with another projection operable to effect release of such constraint.

7. A machine for soldering the side seam joints of can bodies comprising elongated guide rails for supporting the bodies axially in a row, a molten solder applicator which flows solder mounted adjacent to the rails, a can body motivating chain trained about a sprocket and movable along a path parallel to and spaced from said rails, the chain including uniformly spaced, pivotal lug means for engaging the trailing ends of said bodies to hold them against rotation while moving along said rails, and fixed chain guide means cooperative with the chain as it traverses said parallel path of the chain movement to move the joints to and through the solder flow from said applicator, means on said sprocket for engaging said lug means to effect release of the successive bodies after their joints have been soldered.

8. A machine for soldering the side seam joints of can bodies comprising: a stub horn mountable as an axial extention of a can body forming horn; a frame and a molten solder applicator means mounted on the frame, at least one guide rail extending parallel and beneath the stub horn for slidably supporting the bodies as they axially approach the applicator means; a body motivating chain comprising spaced, pivotal lugs engageable with the trailing ends of the bodies, the chain being trained over spaced sprockets located one adjacent to the stub horn and one disposed downstream from the applicator means; a chain guide mounted on said frame for receiving said motivating chain between said sprockets, each of said lugs being formed with a body gripping projection, sized for extending from the chain guide and cam means at the leading end of said chain guide cooperative with each lug preceding over the stub horn to affect gripping of each body to be soldered.

9. A machine as in claim 8 and further comprising at least one protrusion on the sprocket downstream from the applicator for effecting release of each lug from its gripping relation to a can body.

* * * * *

Disclaimer 4,202,483.—*Frederick Stirling Sillars,* Beverly, Mass. CAN BODY CONVEYOR WITH ANTI-ROTATION MECHANISM. Patent dated May 13, 1980. Disclaimer filed Mar. 27, 1981, by the assignee, *USM Corp.*

Hereby enters this disclaimer to claims 1 to 6 of said patent.

[*Official Gazette July 14, 1981.*]